United States Patent
Tonewizki et al.

(10) Patent No.: US 10,444,059 B2
(45) Date of Patent: Oct. 15, 2019

(54) DEVICE FOR MEASURING A FILL LEVEL OF A LIQUID IN A CONTAINER

(71) Applicant: Hella KGaA Hueck & Co., Lippstadt (DE)

(72) Inventors: Sergej Tonewizki, Diepholz (DE); Ingo Zoyke, Stuhr Moordeich (DE)

(73) Assignee: HELLA KGAA HUECK & CO., Lippstadt (DE)

(*) Notice: Subject to any disclaimer, the term of this patent is extended or adjusted under 35 U.S.C. 154(b) by 97 days.

(21) Appl. No.: 15/716,035

(22) Filed: Sep. 26, 2017

(65) Prior Publication Data

US 2018/0087951 A1 Mar. 29, 2018

(30) Foreign Application Priority Data

Sep. 27, 2016 (DE) .................. 10 2016 118 231

(51) Int. Cl.
*G01F 23/00* (2006.01)
*B60K 1/00* (2006.01)
*F01M 11/12* (2006.01)
*G01F 23/296* (2006.01)
*B60K 15/03* (2006.01)

(52) U.S. Cl.
CPC ............ *G01F 23/2962* (2013.01); *B60K 1/00* (2013.01); *F01M 11/12* (2013.01); *B60K 2015/03217* (2013.01); *F16N 2200/18* (2013.01); *F16N 2250/18* (2013.01)

(58) Field of Classification Search
CPC ............ B60K 1/00; B60K 2015/03217; F01M 11/12; F01M 2011/1453; F16N 2200/18; F16N 2250/18; G01F 23/2962; G01F 23/296; G01F 23/2968; G01N 2291/02836

USPC ............................................ 73/290 R, 290 V
See application file for complete search history.

(56) References Cited

U.S. PATENT DOCUMENTS

| | | | |
|---|---|---|---|
| 5,456,108 A * | 10/1995 | Birkett ................. | G01F 23/2962 73/290 V |
| 9,121,745 B2 | 9/2015 | Beyer et al. | |
| 2009/0301187 A1* | 12/2009 | Beyer ................... | G01F 23/296 73/290 V |
| 2011/0228641 A1* | 9/2011 | Niemann ............. | G01F 23/2962 367/99 |
| 2012/0152015 A1* | 6/2012 | Beyer ................... | G01F 23/296 73/290 V |

(Continued)

FOREIGN PATENT DOCUMENTS

DE 102013016164 A1 4/2015
WO WO 2008/009277 A1 1/2008

*Primary Examiner* — John Fitzgerald
*Assistant Examiner* — Truong D Phan
(74) *Attorney, Agent, or Firm* — Muncy, Geissler, Olds & Lowe, PLLC

(57) ABSTRACT

A device for measuring a fill level of a liquid in a container with an ultrasonic sensor, wherein the ultrasonic sensor is arranged at the bottom end of a damping cup with a measuring tube, wherein the top area of the measuring tube has at least one inner ventilation hole and a cover assigned to the inner ventilation hole. The cover surrounds at least the upper end area of the measuring tube and itself has at least one outer ventilation hole, wherein at least one screen is present in the cover and is in contact with the cover at the top. The screen is in contact with the cover at the top and extends horizontally from the measuring tube as far as a side wall of the cover.

9 Claims, 4 Drawing Sheets

(56) References Cited

U.S. PATENT DOCUMENTS

2015/0090018 A1* 4/2015 Niemann ............... F01M 11/06
                                                      73/114.55
2015/0377684 A1* 12/2015 Strackerjan ......... G01F 23/2968
                                                      73/290 V

* cited by examiner

DEVICE FOR MEASURING A FILL LEVEL OF A LIQUID IN A CONTAINER

CROSS-REFERENCES TO RELATED APPLICATIONS

This application claims priority of Application No. 10 2016 118 231.1 filed in Germany on 27 Sep. 2016 under 35 U.S.C. § 119; the entire contents of all of which are hereby incorporated by reference.

BACKGROUND OF THE INVENTION

The invention relates to a device for measuring a fill level of a liquid in a container having an ultrasonic sensor, wherein the ultrasonic sensor is arranged at the bottom end of a damping cup with a measuring tube, wherein the upper region of the measuring tube has at least one inner ventilation hole and a cover assigned to the inner ventilation hole, which cover surrounds at least the upper end region of the measuring tube, and in turn has at least one outer ventilation hole, wherein at least one screen is present in the cover and is in contact with the top of the cover.

Devices for measuring the fill level of a liquid in a container having an ultrasonic sensor such as the one described above are used particularly in motor vehicles to measure the fill level of the engine oil. In order to determine the oil level in the container, ultrasonic waves are emitted from the bottom of the device and reflected at the phase boundary between the oil and the air above it to be received by the ultrasonic sensor again. The fill level in the container can be determined from the travel time of the ultrasonic waves. However, in an engine which is running, particularly in a motor vehicle, it is difficult if not impossible to determine the oil fill level, because the oil is heavily foamed and the sonic waves are reflected by gas bubbles. The values detected therefore differ widely. In order to be able to take a measurement with readable values, an unambiguous boundary surface between the gas and oil media is required. To achieve this, devices called damping cups are attached to the ultrasonic sensors. Inside these damping cups, which cover the measuring section of the ultrasonic sensor, the liquid that is to be measured is calmed, and communicates with the container via a small opening in the damping cup. Only very few gas bubbles get into the damping cup through the small opening between the damping cup and the container. The fill level in the damping cup is equal to the fill level outside the damping cup, but at the same time slows fluctuations that are caused for example by acceleration or cornering. Typically, an antechamber is also assigned to the damping cup and serves to degas the liquid to be measured, particularly foamed oil, thus creating a liquid inside the measuring section of the damping cups that has been degassed and is relatively bubble-free. The damping cups are typically made of plastic, usually from several parts that have been welded, clipped or bonded together.

A species-related device for measuring a fill level of a liquid is known from DE 10 2013 016 164 A1 for example. In that device, a cap is provided in the upper region of a damping cup, which cap has a centrally positioned measuring tube. The cap or cover particularly prevents foam from getting into the measuring tube from the outside, but it must also have a ventilation hole so that the liquid to be measured can rise and fall in the measuring tube. In order to protect the measuring tube from oil foam or liquid that enters through the outer ventilation hole of the cover, a screen is provided which lies over the top of the cover and extends downwards. In this case, it is in the form of a ring.

BRIEF SUMMARY OF THE INVENTION

The problem addressed by the invention is that of creating a device of the type described in the introduction which is protected particularly well from oil foam entering the top region.

This problem is solved with a device having the features of claim 1. Advantageous variants of the invention are described in the subordinate claims. In a device for measuring a fill level of a liquid in a container with an ultrasonic sensor, wherein the ultrasonic sensor is arranged at the bottom end of a damping cup with a measuring tube, wherein the measuring tube has at least one inner ventilation hole in the upper region and one cover assigned to the inner ventilation hole, which cover surrounds at least the upper end region of the measuring tube and in turn has at least one outer ventilation hole, wherein at least one screen is present in the cover and is positioned immediately above the cover, it is provided as essential to the invention that the screen which is positioned immediately above the cover extends horizontally from the measuring tube as far as a side wall of the cover and that at least four screens are provided between the one or more inner ventilation holes and the one or more outer ventilation holes, so that when the device is operating at least two air bubbles are trapped in the region of the screens. In this way, screens or vanes are formed below the top or the upper closure of the cover which project downwards from the top and block the ventilation path completely since they reach from the measuring tube as far as a side well of the cover. This causes air bubbles to form in this region which are suspended in a defined manner in the region of the screens, thus providing effective protection against oil foam penetrating through the outer ventilation hole. When four screens are used and at least two air bubbles are formed, greater stability is achieved not only with respect to vibrations but also improved stability when the vehicle and therewith also the device for measuring the fill level are inclined.

In a preferred variant of the invention, one inner ventilation hole and one out ventilation hole are provided and are offset by 180° with respect to one another. Two functional ventilation paths are created between these two ventilation holes, on which at least two screens are provided. In such a case, as many as three bubbles would form, one between each two screens and a third in the region of the inner ventilation hole, also between two screens of course. In the fourth quadrant, closest to the outer ventilation hole, a bubble does not form due to said outer ventilation hole.

In another preferred variant, the screens are designed symmetrically. In particular, the notional extensions of the screens intersect each other at an angle of 90°. With a symmetrical structure of such kind, the protection the device affords against penetration by oil foam is independent upon inclination.

In another preferred further development of the invention, the height of the screens is less than double the height of the outer ventilation hole. In particular, the screens are even smaller than 1.5 times as high as the outer ventilation hole. With the present device according to the invention, said screens may be constructed with this little height because multiple air bubbles are reliably trapped here. The screens must be at least as high as the outer ventilation hole to ensure protection against the ingress of oil foam, but at the same time they should be as small as possible so that as little installation space as possible is lost.

In another preferred variant of the invention, the cross-section of the cover is constricted in the contact area between the screen and the side wall, wherein a widened area is present between two contact areas. As a result, the area in which the air bubbles are located is widened, which in turn enables the height of the screen to be reduced. The ability of the oil foam to drain out downwards is also improved thereby.

In another preferred embodiment of the invention, the screens are in the form of vanes which are constructed integrally with the measuring tube. The covers or vanes are positioned so as to lie closely against the cover, but are connected structurally and materially to the measuring tube. This applies with regard to contact with the screen both upwardly, that is to say towards the top of the screen, and sideways, that is to say towards the lateral walls of the screen.

In another preferred variant of the invention independent thereof, the cover extends over more than 80% of the height of the measuring tubes. Consequently, the cover is preferably not just in the form of a cap but rather an outer shroud which extends almost to the foot of the damping cup, or preferably even as far as the foot of the damping cup.

The screen preferably forms an accommodation space between the measuring tube the screen encircling the measuring tube up to more than 50% of the height of the measuring tube for oil foam that passes through the outer ventilation hole. Thus, oil foam that has reached this region is able to drain away very quickly. This accommodation space preferably has a horizontal wall in the lower region thereof, in which a bottom drain is provided in the form of a hole.

A further aspect of the invention consists in the provision of an oil-lubricated engine equipped with the device described in the preceding text.

BRIEF DESCRIPTION OF THE SEVERAL VIEWS OF THE DRAWINGS

In the following, the invention will be explained with further reference to an exemplary embodiment represented in the drawing. In detail, the schematic diagrams show in.

DETAILED DESCRIPTION OF THE INVENTION

Figure 1:
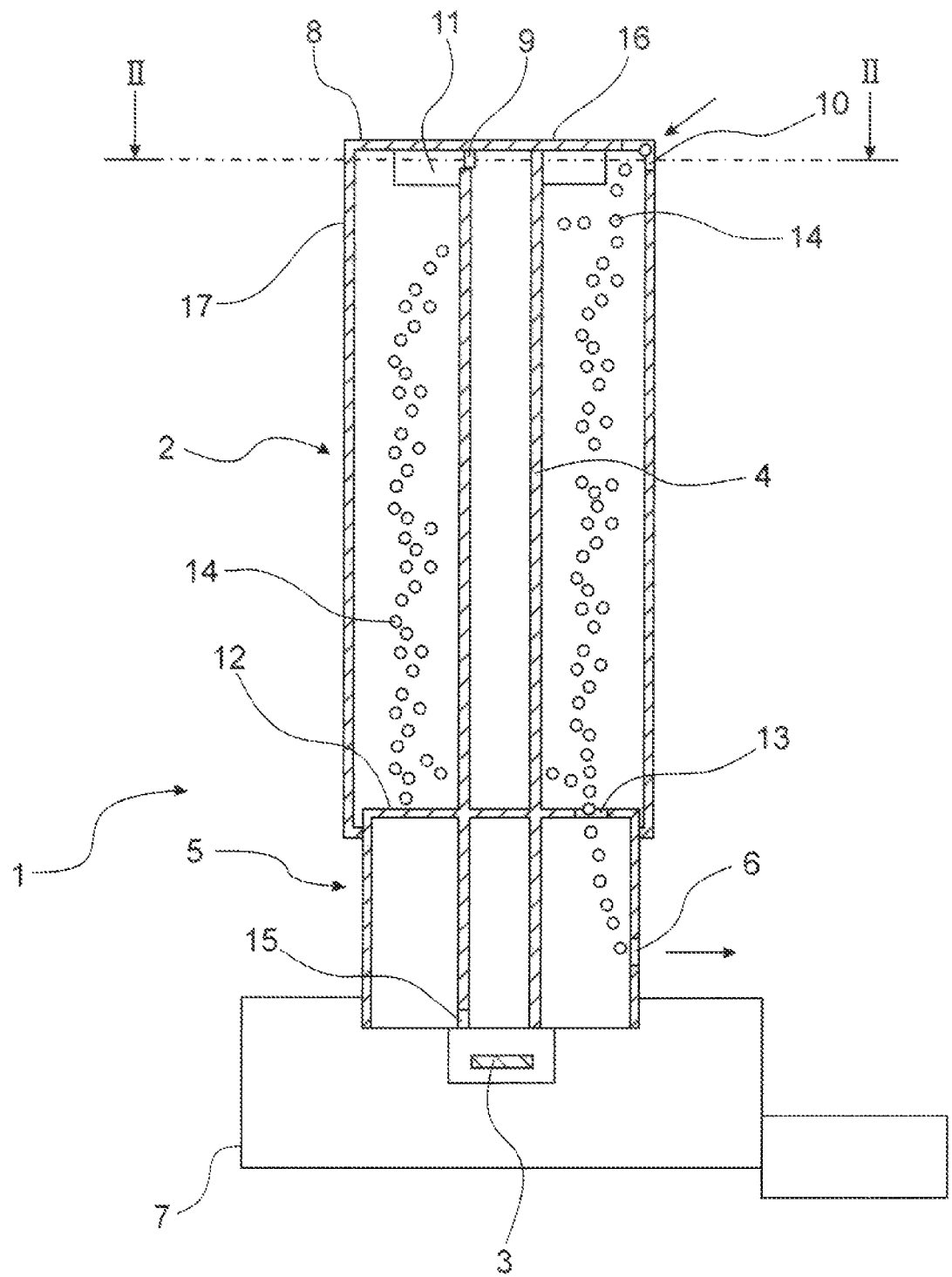
FIG. 1 a diagrammatic cross-section of the device according to the invention.

In FIG. 1, a cross-sectional view of a device 1 according to the invention is represented. Essentially, it includes a damping cup 2 with a measuring tube 4 arranged centrally therein. An ultrasonic sensor 3 is arranged below the measuring tube 4 and emits ultrasonic waves which are radiated upwards inside the measuring tube 4, are reflected on a boundary surface between a liquid, particularly oil, and air and are then received again by the ultrasonic sensor 3. The height of the fill level may then be calculated from the travel time of the signal. In general, device 1 serves in the first place to provide a measurable surface that has little foam and is calmer than the rest of the fill level in the container. For this purpose, damping cup 1 has an inlet opening 6 in the lower region thereof, through which oil from outside enters the damping cup 1 and is first degassed in an antechamber 5. Further geometrical structures are often disposed in antechamber 5 as well, and are designed to prolong the time for which the liquid remains in the antechamber 5, but which are not represented her. The liquid passes out of antechamber 5 through an antechamber opening 15 and then enters the measuring tube 4 in degassed form and almost completely without bubbles. The level of the liquid in the measuring tube 4 is substantially equal to the level of the oil outside the damping cup 1. This is also assured particularly by an inner ventilation hole 9 at the top end of the measuring tube 4. In order to protect the measuring tube 4 from the oil foam entering through the inner ventilation hole 9, a cover 8 is provided which covers the inner ventilation hole 9 and on the other hand itself has an outer ventilation hole 10, which is offset with respect to the inner ventilation hole 9. In this case, the cover 8 is not only in the form of a small cap, as is often used otherwise, but it extends over more than 50% of the height of the damping cup, in this case even over more than 80% of the height of the damping cup, and extends as far as the region of the antechamber 5. Consequently, a very large accommodation space is created between the measuring tube 4 and the cover 8, into which oil foam entering through the outer ventilation hole 10 may be diverted and retained temporarily. This intrusive oil foam is denoted with reference number 14. The cover has a horizontal wall 12, which in this case is identical to the upper wall of the antechamber 5. Here, an additional accommodation space is defined. The oil foam 14 can then pass into the antechamber 5 through an opening 13 in said horizontal wall 12 and there is it able to drain to the outside again through the inlet opening 6. Screens 11 are arranged in the upper end region of the cover 8 and particularly in contact with the top 16 of the cover 8, which screens extend downwards from the top 16 and here also according to the invention extend from the measuring tube 4 as far as a side wall 17 of the cover 8. In the representation of FIG. 1 the visual impression given is that the screen 11 does not reach as far as the side wall 17, but this is due to the fact that the screen 11 is angled backwards here and in cross section is in contact with the annular side wall 17 of the cover 8.

Figure 2:
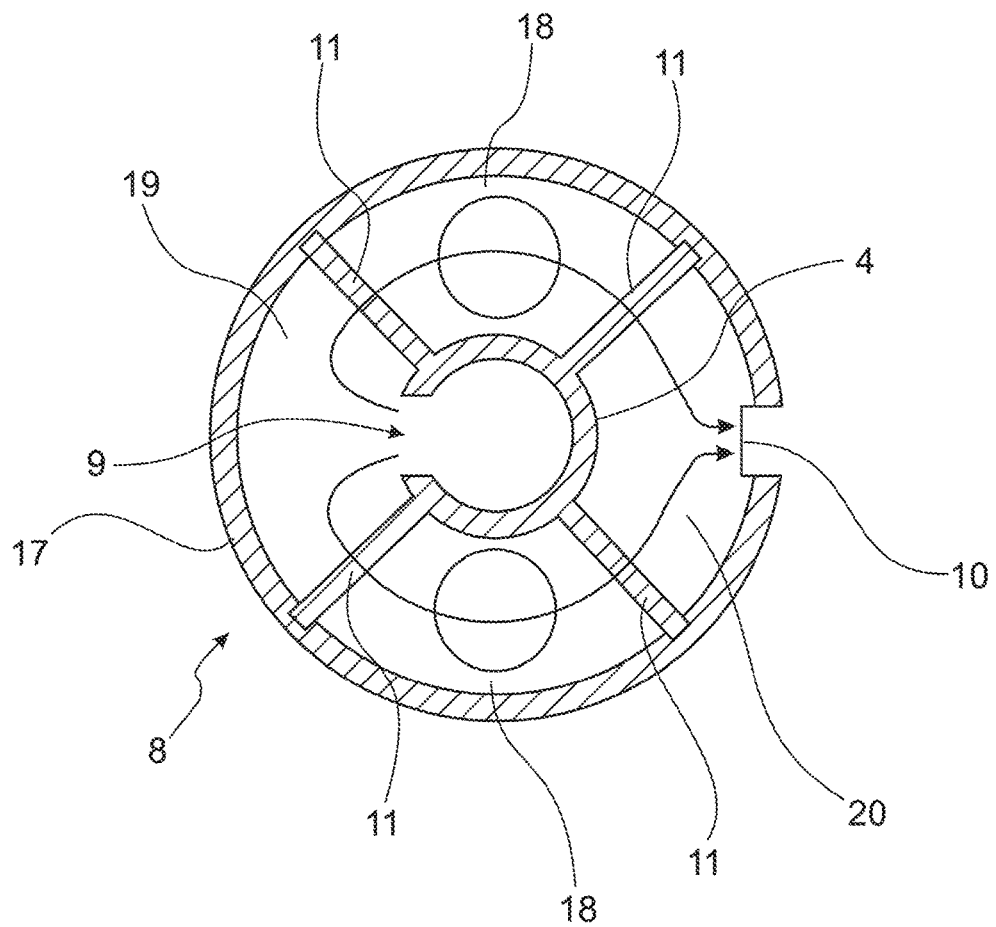
FIG. 2 a diagrammatic cross-sectional view along line II-II in FIG. 1.

FIG. 2 shows a top view of the device 1 according to FIG. 1 along line II-II. In this case, then, a cross section directly below the top 16 of the cover 8 is represented. In the top view, the measuring tube 4 and the cover 8, particularly the side wall 17 of cover 8 is visible. This cross-sectional view of the measuring tube 4 shows the inner ventilation hole 9 thereof. The outer ventilation hole 10 in the cover 8 is also visible here. Four screens 11 in the form of relatively narrow vanes emanating from the measuring tube 4 are provided here, and are constructed so as to touch the measuring tube, in particular they are integral with the measuring tube 4 and extend from the measuring tube 4 as far as side the wall 17 of the cover 8. The ventilation path of the measuring tube 4 is directed starting from the inner ventilation hole 9 in either direction around the measuring tube 4 as far as the outer ventilation hole 10. Screens 11 extend upwards as far as the top 16 of the cover 8, thus creating regions 18 that are closed at the top and to some degree laterally between the vane-like screens 11, in which air bubbles are trapped and form a barrier against the oil foam 14 entering through the outer ventilation hole 10. Instead, the oil foam 14 which enters there is able to sink in region 20 into the relatively large accommodation space between the cover 8 and the measuring tube 4. In the embodiment shown here, a third air bubble is trapped in region 19, that is to say between the two screens 11 in the region of inner ventilation hole 9. In this way, effective protection is assured.

Figure 3:
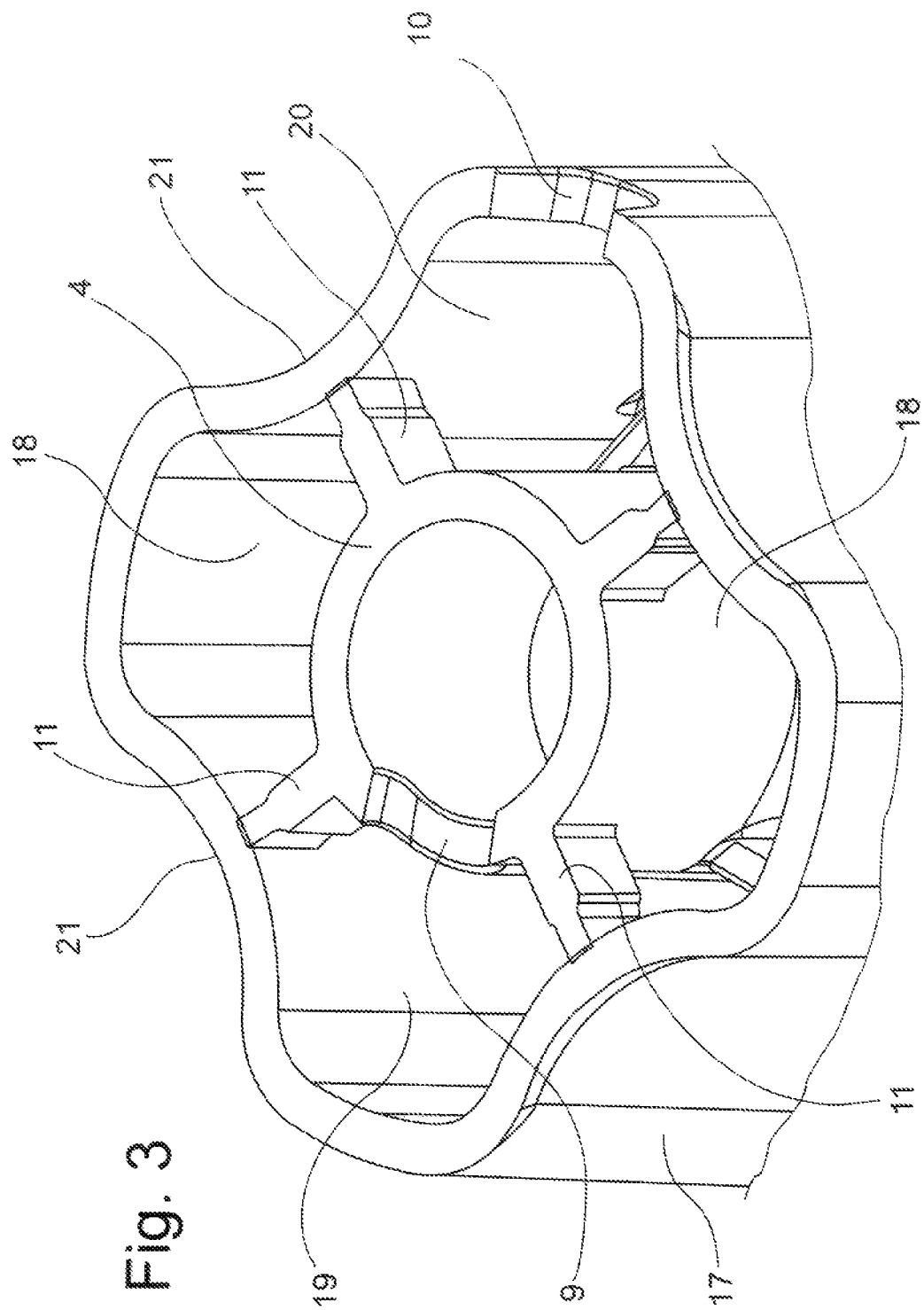
FIG. 3 a perspective top view of a device shown in detail along line II-II in FIG. 1.

FIG. 3 shows a perspective view of an upper end region of the damping cup 1, which is substantially the same as the embodiment of FIG. 2, but is shown in a perspective view here to illustrate the height of the screens 11, and here also a more detailed geometrical representation of the shape of the cover 8 is shown. Otherwise, identical elements are denoted with the same reference figures. It is further shown here that the height of the vane-like screens 11 is relatively small, specifically they are only slightly higher than the depth of the outer ventilation hole 10. In particular, the height of the screen 11 is less than twice the depth of the outer ventilation hole 10. In addition, the outer annular shape of cover 8 is not circular, but rather has constrictions 21 in the vicinity of the touching screens 11, so that the distance between the measuring tube 4 and the side wall 17 of the cover 8 is smallest in the area of the screens 11, and the distance between the measuring tube 4 and the side wall 17 of the cover 8 is greatest halfway between the two screens 11. As a result, the regions 18, 19 and 20 are widened and enlarged between the screen 11, so that air bubbles can form particularly readily here and a particularly good throughflow or a particularly good draining function of the entering oil foam is assured in the region 20.

Figure 4:
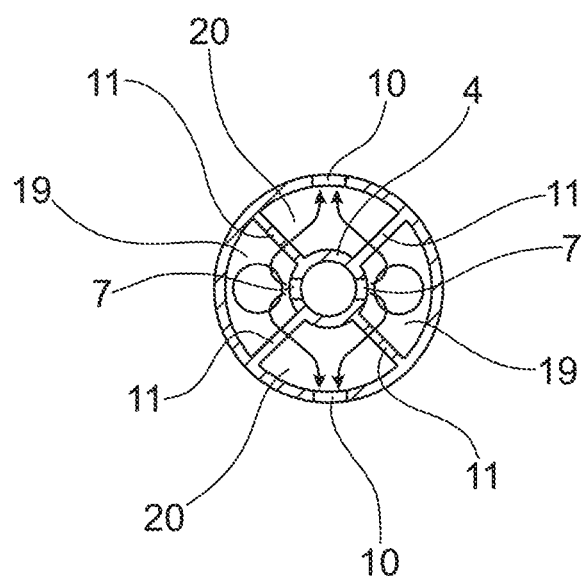
FIG. 4 a view similar to that of FIG. 2 in a first alternative embodiment.

The representation of FIG. 4 is similar to that of FIG. 2, but in this case the embodiment shown is slightly different. Here, two inner ventilation holes 7 are provided opposite each other in the upper rim area of the measuring tube 4. Two outer ventilation holes 10 are provided, each offset by 90° relative to said the ventilation holes. Thus, a total of four different ventilation paths are created here, which run from each of the inner ventilation holes 7 to each of the two outer ventilation holes 10. Air bubbles are trapped or may be trapped in each of the regions 19 between the two screens 11 in the area of the inner ventilation hole 7. They protect the measuring tube 4 against any oil foam 14 that might enter.

Figure 5:
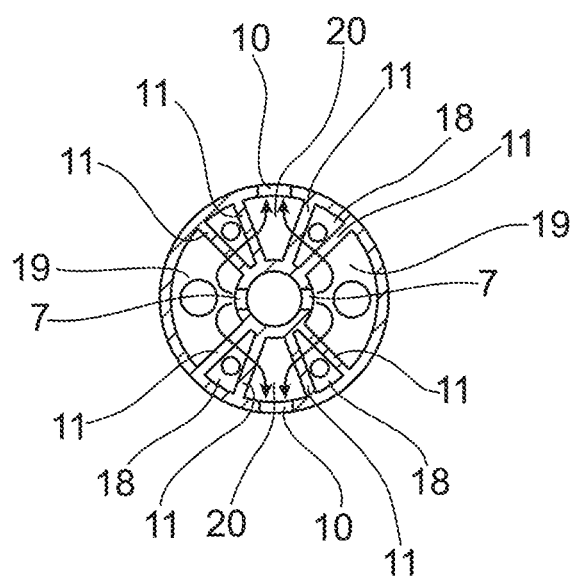
FIG. 5 a view similar to that of FIG. 2 in a second alternative embodiment.

Another alternative embodiment is represented in FIG. 5, wherein the representation again corresponds to the views of FIGS. 2 and 4. Here too, two inner ventilation holes 7 and two outer ventilation holes 10 are present, thus resembling the embodiment of FIG. 4. In this case however, two screens 11 are provided between the inner ventilation holes 7 and the outer ventilation holes 10 in each ventilation path. Accordingly, a total of eight screens 11 are provided, and a total of four regions 18 are formed between each two screens 11, in each of which an air bubble is trapped. One air bubble is also trapped in each of the two regions 19 adjacent to inner ventilation hole 7. There are no air bubbles trapped in each of the regions 20, because these are the regions where the air escapes through outer ventilation hole 10.

All of the features explained in the preceding description and in the claims can be combined in any permutation with the features of the independent claim. The disclosure of the invention is thus not limited to the combinations of features that have been described and claimed, but all feature combinations that are practicable within the scope of the invention are rather to be treated as having been disclosed.

The invention claimed is:

1. A device for measuring a fill level of a liquid in a container having an ultrasonic sensor, wherein the ultrasonic sensor is arranged at a bottom end of a damping cup with a measuring tube, wherein the measuring tube has at least one inner ventilation hole in an upper end region thereof and one cover assigned to the inner ventilation hole, the cover surrounds at least the upper end region of the measuring tube and has at least one outer ventilation hole in the upper end region of the measuring tube,
   wherein at least four screens are present in the cover and upwardly in contact with the cover,
   wherein the at least four screens are upwardly adjacent to the cover and extend horizontally from the measuring tube as far as a side wall of the cover, and
   the at least four screens are provided between the at least one inner ventilation hole and the at least one outer ventilation hole, so that when the device is operating, one air bubble is trapped in each of regions formed between two screens except regions connecting to the at least one outer ventilation hole,
   wherein a height of the screens is smaller than twice a height of the outer ventilation hole.

2. The device according to claim 1, wherein two functional ventilation paths with at least two screens are provided between the inner ventilation hole and the outer ventilation hole.

3. The device according to claim 1, wherein notional extensions of the screens intersect each other at an angle of 90°.

4. The device according to claim 1, wherein the cover extends over more than 80% of a height of the measuring tube.

5. The device according to claim 1, wherein a cross-section of the cover is constricted in the contact area between the screen and the side wall of the cover, wherein a widened area is presented between two contact areas.

6. The device according to claim 1, wherein the screens are in a form of vanes which are constructed integrally with the measuring tube.

7. An internal combustion engine, equipped with a device according to claim 1 for measuring the fill levels of the engine oil.

8. The device according to claim 1, wherein the screen forms an accommodation space for oil foam which enters through the outer ventilation hole between the measuring tube and the screen encircling the measuring tube to more than 50% of the height of the measuring tube.

9. The device according claim 8, wherein the accommodation space has a bottom drain through an opening in a horizontal wall.

* * * * *